United States Patent [19]

McGruder

[11] Patent Number: 4,967,942
[45] Date of Patent: Nov. 6, 1990

[54] LAWN CHAIR RACK

[76] Inventor: Leo L. McGruder, 1902 E. Park, Pierre, S. Dak. 57501

[21] Appl. No.: 441,176

[22] Filed: Nov. 27, 1989

[51] Int. Cl.$^5$ ............................................... B60R 9/08
[52] U.S. Cl. .............................................. 224/42.03 R
[58] Field of Search ........... 224/42.07, 42.06, 42.03 B, 224/42.03 R

[56] References Cited

U.S. PATENT DOCUMENTS 3,800,967  4/1974  Kosecoff ...................... 224/42.03 B
4,275,981  6/1981  Bruhn ............................... 224/42.06

Primary Examiner—Renee S. Luebke
Attorney, Agent, or Firm—Zarley, McKee, Thomte, Voorhees & Sease

[57] ABSTRACT

A lawn chair rack includes a generally vertical oriented frame removably mounted to the rearward bumper of a trailer. A pair of tubular members are mounted to the lower end of the frame and have a length adjustably extension arms projecting rearwardly therefrom. A third tubular member is mounted to the upper end of the frame and has a length adjustable extension arm projecting rearwardly therefrom. Each of the extension arms is generally L-shaped such that a leg of the "L" projects upwardly from the lower extension arms and projects downwardly from the upper extension arm to retain lawn chairs against the frame. A pair of brackets mounted on the rear bumper of the trailer receive the lower ends of the frame, and a selectively removable pin will lock each leg of the frame in position on the bumper. A support arm extends from a rearward frame member of the trailer to the lawn chair rack frame generally intermediate the upper and lower ends. The support arm is removably connected to the lawn chair rack frame to restrain the rack from rocking movement about the brackets on the bumper.

4 Claims, 3 Drawing Sheets

LAWN CHAIR RACK

TECHNICAL FIELD

The present invention relates generally to apparatus for holding and storing lawn chairs, and more particularly to an improved lawn chair rack which is removably mounted on a camper trailer or the like.

BACKGROUND OF THE INVENTION

Camper trailers of various types have long been an economical and enjoyable method for vacationing. The benefits of utilizing a camper trailer over a conventional tent reside in the quick set-up times and the capability of bringing many conventional conveniences of the home along on a camping trip.

However, one drawback is in the limited amount of storage space in conventional camper trailers. This lack of storage space is exacerbated by those who desire to take lawn chairs or the like along on the trip. While lawn chairs can fold to a relatively compact size, their bulkiness dramatically decreases the storage space available in a camper trailer. For this reason, it is not unusual to see folding lawn chairs tied to the roof or bumper of camper trailers in order to allow for greater storage space within the trailer itself.

Tying the lawn chairs to the trailer not only makes them difficult to quickly and easily remove from the trailer, but also requires some expertise in tying the lawn chair into a position which will not be torn free by the wind during transport.

It is therefore a general object of the present invention to provide a rack for removably retaining lawn chairs on a camper trailer or the like.

Another object is to provide a lawn chair rack which is operably mounted on the camper for quick and easy removal or attachment.

A further object of the present invention is to provide a lawn chair rack which is adjustable to hold one or more lawn chairs in position.

Yet another object of the present invention is to provide a lawn chair rack which will retain the lawn chairs within a single unit removable from the trailer and transported independently.

These and other objects of the present invention will be apparent to those skilled in the art.

SUMMARY OF THE INVENTION

The lawn chair rack of the present invention includes a generally vertically oriented frame removably mounted to the rearward bumper of a trailer. A pair of tubular members are mounted to the lower end of the frame and have length-adjustable extension arms projecting rearwardly therefrom. A third tubular member is mounted to the upper end of the frame and has a length-adjustable extension arm projecting rearwardly therefrom. Each of the extension arms is generally L-shaped such that a leg of the "L" projects upwardly from the lower extension arms and projects downwardly from the upper extension arm to retain lawn chairs against the frame.

A pair of brackets mounted on the rear bumper of the trailer receive the lower ends of the frame, and a selectively removable pin will lock each leg of the frame in position on the bumper. A support arm extends from a rearward frame member of the trailer to the lawn chair rack frame generally intermediate the upper and lower ends. The support arm is removably connected to the lawn chair rack frame to restrain the rack from rocking movement about the brackets on the bumper.

DESCRIPTION OF THE PREFERRED EMBODIMENT

Figure 1:
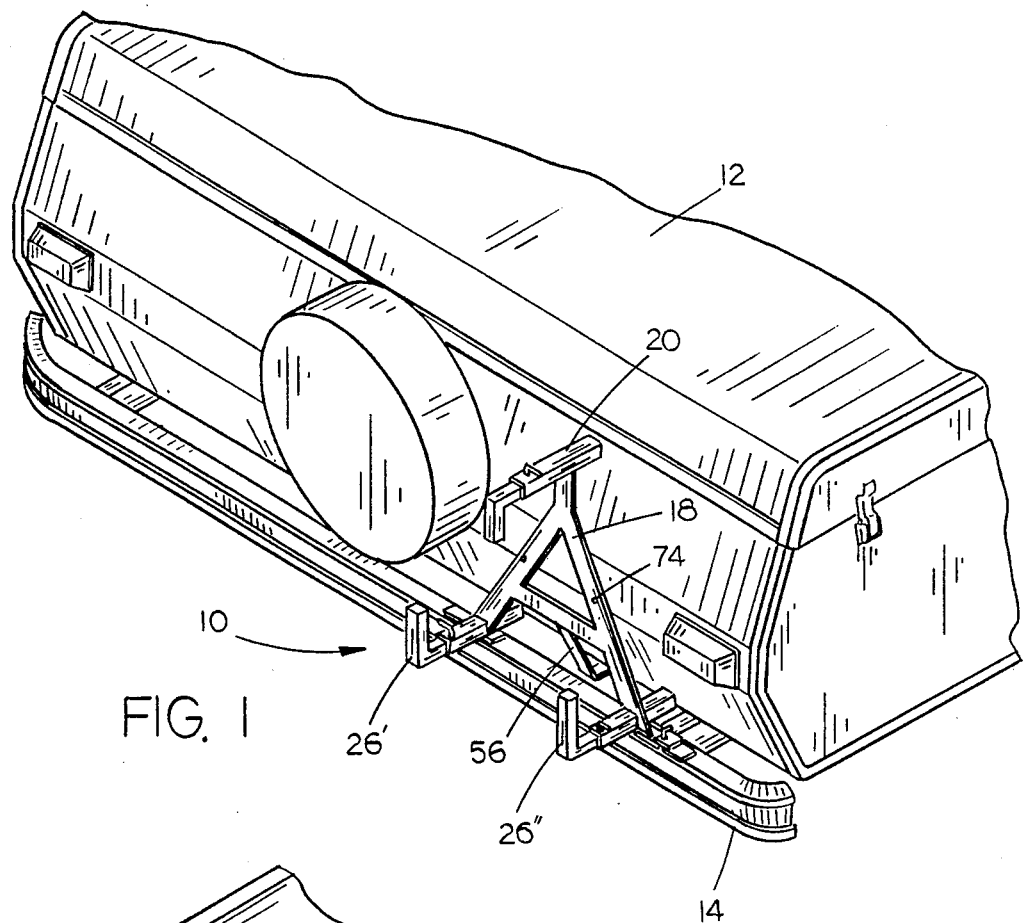
FIG. 1 is a perspective view of the rearward portion of a camper trailer with the present invention mounted thereon.
Figure 2:
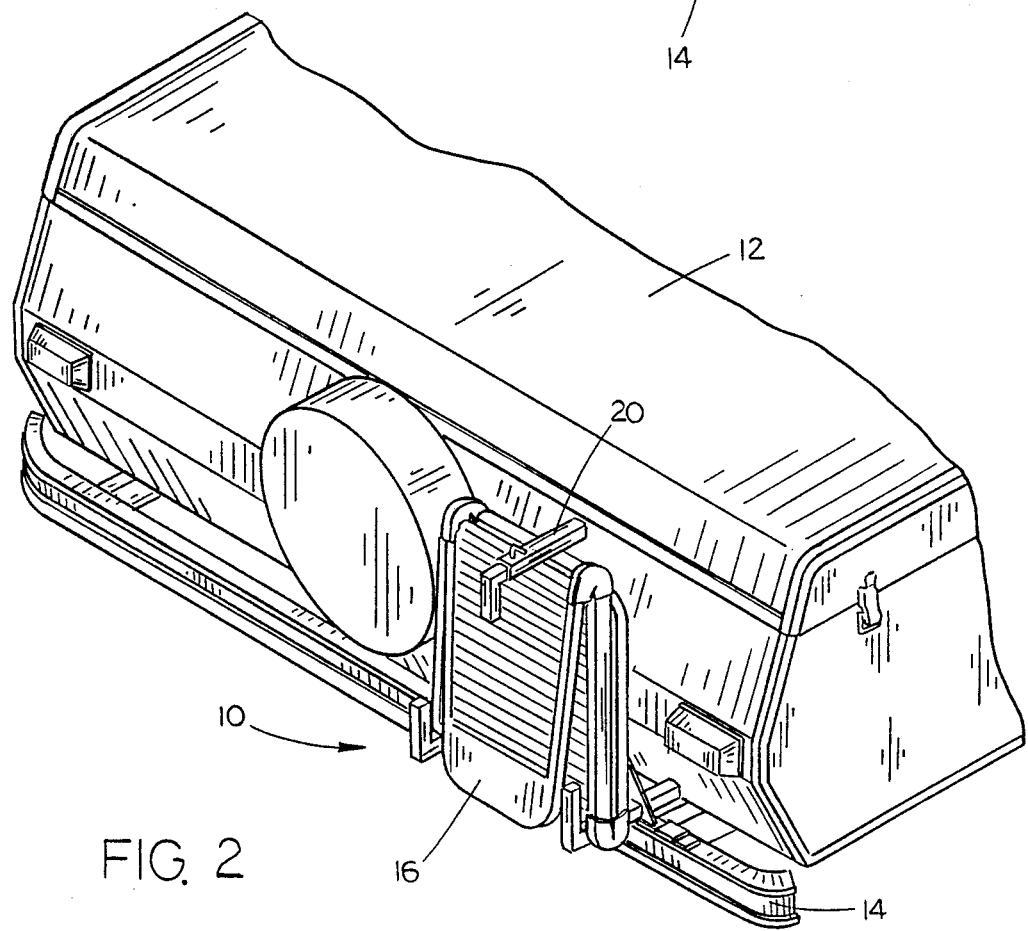
FIG. 2 is a perspective view similar to FIG. 1, with a lawn chair mounted in the lawn chair rack.

Referring now to the drawings, in which similar or corresponding parts are identified with the same reference numeral throughout the drawings, and more particularly to FIG. 1, the lawn chair rack of the present invention is identified generally at 10 and is shown mounted on a conventional camper trailer 12. Camper trailer 12 includes a rear bumper 14 projecting rearwardly therefrom, upon which the lawn chair rack 10 is removably mounted. As shown in FIG. 2, a lawn chair 16 may be securely mounted within rack 10 on trailer 12.

Figure 3:
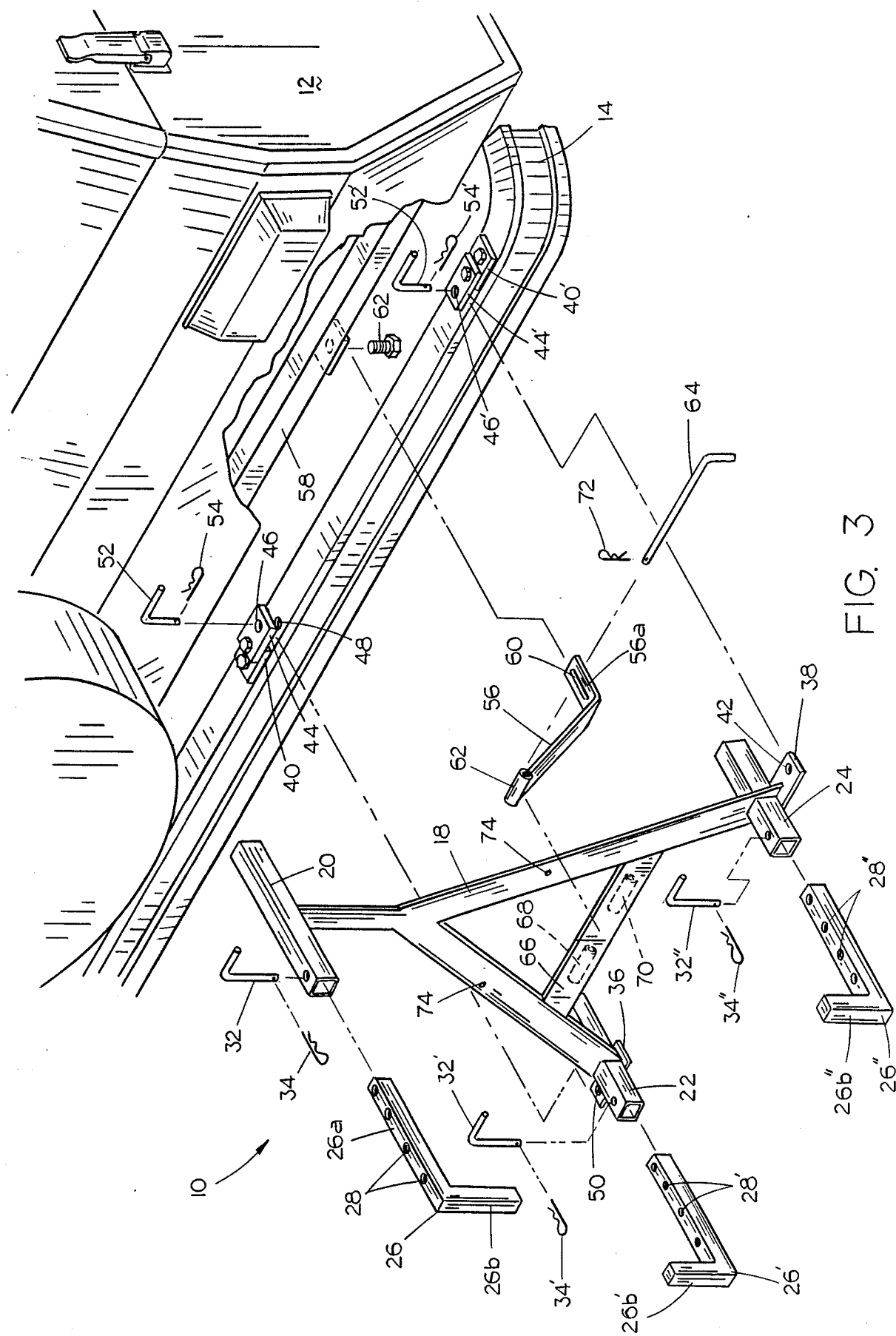
FIG. 3 is an enlarged perspective view of a portion of FIG. 1 with the lawn chair rack of the present invention shown in exploded view.

Referring now to FIG. 3, lawn chair rack 10 includes a rigid A-shape frame 18 having an upper tube 20 mounted at the apex of the "A", and lower tubes 20 and 22 mounted on the "feet" of the A-frame 18. Tubes 20, 22 and 24 are mounted in generally horizontal positions on frame 18, and are parallel.

An L-shaped extension arm 26 is provided for telescopic connection within upper tube 20. The horizontal back 26a of extension arm 26 has a plurality of spaced-apart apertures 28 formed therein located for selective alignment with an aperture 30 in the end of upper tube 20. A selectively removable pin 32 may be journaled through the aperture in tube 20 and through one of the apertures in extension arm 26 so as to selectively adjust the distance between the depending leg 26b of extension arm 26 and frame 18. A cotter key 34 is connected to pin 32 to selectively lock the pin in position.

A similar extension arm 26' is provided for hollow tube 22, and a third extension arm 26" is provided for tube 24. Extension arms 26' and 26" include apertures 28' and 28" for use in conjunction with pins 32' and 32" respectively. Thus, hollow tubes 22 and 24 combine with extension arms 26' and 26" to form support members for supporting lawn chairs 16. Hollow tube 20 is used in conjunction with extension arm 36 to form a retention member for selectively retaining lawn chairs 16 on rack 10. Legs 26b' and 26b" are oriented upwardly so as to form restraining arms, or "stops", which retain a lawn chair 16 on the rack 10.

A horizontally disposed base plate 36 is mounted to the lower side of lower tube 22, and a similar base 38 is mounted to the lower side of lower tube 24. Base plates 36 and 38 act as feet for lawn chair rack 10 and will rest on bumper 14 when the lawn chair rack 10 is mounted on trailer 12. A pair of stepped brackets 40 and 42 are bolted to bumper 14 in spaced-apart orientation, and will selectively retain base plates 36 and 38 respectively in position on bumper 14. Stepped bracket 40 includes an overhanging lip 44 with an aperture 46 formed therein in alignment with an aperture 48 in bumper 14. An aperture 50 in base plate 36 will be aligned with aperture 46 in lip 44 and aperture 48 in bumper 14 when lawn chair rack 10 is positioned on bumper 14. Bracket 40 is formed with overhanging lip 44 spaced above bumper 14 to allow base plate 36 to slide therebetween. Once in position, a pin 52 is journaled through apertures 46, 50 and 48 and locked in position with a cotter key 54.

Stepped bracket 40' is mounted to bumper 14 in the same fashion as stepped bracket 40, and includes overhanging lip 44' with an aperture 46' therethrough. Base plate 38 has an aperture 42 therethrough which will be aligned with aperture 46' and an aperture 48' (not shown) when base plate 38 is position between overhanging lip 44' and bumper 14. A pin 52' may then be journaled and locked in place with cotter 54'.

In order to prevent the upper end of frame 18 from rocking forwardly and rearwardly, a support arm 56 is operably connected between frame 18 and a frame member 58 of camper 12. Support arm 56 has a lower horizontal leg 56a with a slot 60 therethrough which will receive a bolt 62, or the like, to fasten support arm 56 to frame member 58. The upper end of support arm 56 has a short collar 62 mounted thereon which will receive an elongated pin 64 as described in more detail hereinbelow.

A cross member 66 between the legs of A-frame 18 has a pair of tubular collars 68 and 70 mounted thereon in axial alignment. Tubular collars 68 and 70 have the same interior diameter, which is identical to the interior diameter of collar 62. Tubular collars 68 and 70 are spaced apart a distance equal to the length of collar 62 such that collar 62 may be placed in axial alignment therewith and pin 64 journaled through tubular collar 70, collar 62 and tubular collar 68, to fasten frame 18 to support arm 56. Pin 64 is selectively locked in position by cotter key 72.

In order to install lawn chair rack 10 on the desired camper trailer 12, brackets 40 and 40' are first mounted on bumper 14 spaced apart the appropriate distance to allow base plates 36 and 38 to slide therebetween. Apertures 48 and 48' should then be formed in bumper 14 to allow pins 52 and 52' to be journaled therethrough. Support arm 56 is then bolted to frame member 58 such that collar 62 projects above bumper 14. Frame 18 is then mounted on trailer 12 by sliding base plates 36 and 38 under the overhanging lips 44 and 44' on brackets 40 and 40'. Pins 52 and 52' are then journaled through brackets 40 and 40' and base plates 36 and 38 and secured with cotter keys 54 and 54'. Collar 62 on support arm 56 is then aligned with tubular collars 68 and 70, and pin 64 is journaled therethrough and secured with cotter key 72.

Lower extension arms 26' and 26" are then mounted within hollow lower tubes 22 and 24 and secured at the appropriate distance from frame 18 utilizing pins 32' and 32". Extension arms 26' and 26" should be positioned appropriately for the number of lawn chairs which will be mounted on the rack 10. The lawn chairs 16 are then rested on top of extension arms 26' and 26" and upper extension arm 26 is journaled in upper tube 20 so as to contact the upper end of the lawn chairs. Pin 32 is then locked in position with cotter key 34 to retain the chairs on rack 10.

A pair of apertures 74 are formed in frame 18 (see FIGS. 1 and 3) to which a rope or bungee cord may be connected so as to further restrain lawn chairs 16 within rack 10.

Figure 4:
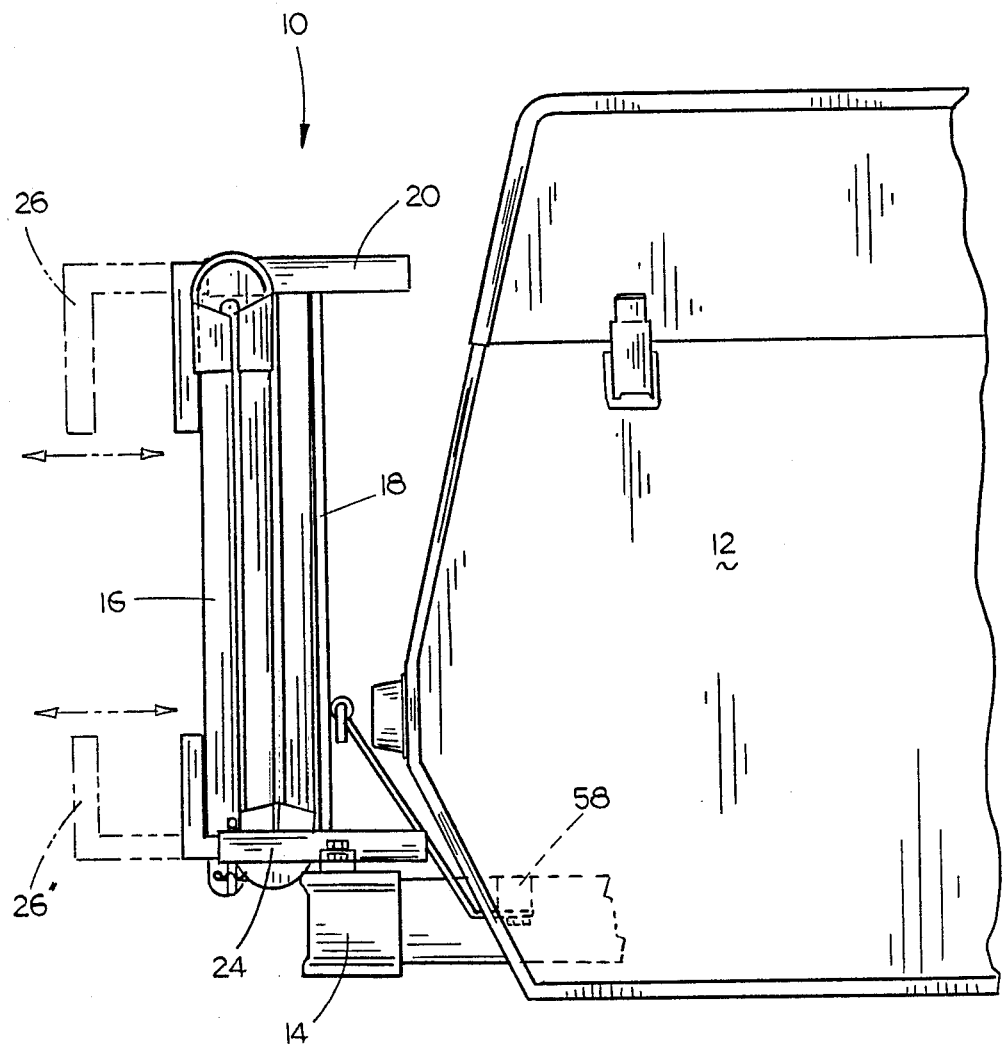
FIG. 4 is a side elevational view of the present invention mounted on a camper trailer.

As shown in FIG. 4, extension arms 26, 26' and 26" are extensible such that greater or fewer chairs may be mounted on the rack 10 and securely held in position on trailer 12. When it is desired to remove the chairs from trailer 12, the owner may either remove the chairs 16 from the rack 10, or simply remove rack 10 from the trailer. Thus, the entire unit of all of the lawn chairs may be easily transported about without requiring the removal of every chair from the rack. To remove rack 10 from trailer 12 it is simply necessary to remove pin 64 from collars 68, 70 and 62, and then remove pins 52 and 52' so as to release base plates 36 and 38. If only one chair need be removed from the rack, pin 32 may be removed such that extension arm 26 can be adjusted to allow the release of the desired lawn chairs.

Whereas the invention has been shown and described in connection with the preferred embodiment thereof, it will be understood that many modifications, substitutions and additions may be made which are within the intended broad scope of the appended claims. For example, lawn chair rack 10 may be installed on any wheeled vehicle with the appropriate bumper and frame member. There has therefore been shown and described an improved lawn chair rack which accomplishes at least all of the above-stated objects.

I claim:

1. A lawn chair rack, comprising:
   a generally vertically oriented frame means for supporting one or more law chairs;
   said frame means including lower support arm means projecting generally horizontally from said frame means for supporting the lower edge of a folded lawn chair;
   said frame means including an upper apex and diverging legs depending therefrom;
   said lower support arm means including stop means for preventing movement of the lower edge of a lawn chair horizontally away from said frame means;
   upper retention arm means projecting generally horizontally from said frame means and spaced above said lower support arm means, for retaining the upper edge of a folded lawn chair against said frame means;
   said retention arm means including a first hollow tubular member mounted adjacent the apex of said frame means;
   a first extension arm adjustably connected to said first tubular member for selective length adjustment;
   said lower support arm means including:
   a second hollow tubular member mounted on one frame leg;
   a third hollow tubular member mounted on a second frame leg;
   a second extension arm adjustably connected to said second tubular member for selective length adjustment; and
   a third extension arm adjustably connected to said third tubular member for selective length adjustment.

2. The lawn chair rack of claim 1, further comprising means for removably connecting said lawn chair rack to a wheeled vehicle.

3. In combination:

a camper trailer having forward and rearward ends, a rearward bumper, and a base frame with a rearward frame member;

means on said trailer for removably mounting a lawn chair rack to said trainer; and a lawn chair rack for selectively retaining a lawn chair, removably mounted on said trailer;

said means for removably mounting said lawn chair rack to said trailer including:

bracket means mounted on said rear bumper for receiving the lower end of said frame means on said bumper;

selectively operable locking means associated with said bracket means and said bumper for selectively retaining said lower end of the frame means on said bumper; and a support member having first and second ends, the first end connected to said rearward frame member and the second end removably connected to said frame means above said lower support arm means, to restrain said rack from rocking movement about said bracket means.

4. The combination of claim 3, wherein said lawn chair rack includes: a generally vertically oriented frame means for supporting one or more lawn chairs; said frame means including lower support arm means projecting generally horizontally from said frame means for supporting the lower edge of a folded lawn chair; said lower support arm means including stop means for preventing movement of the lower edge of a lawn chair horizontally away from said frame means; and upper retention arm means projecting generally horizontally from said frame means and spaced above said lower support arm means, for retaining the upper edge of a folded lawn chair against said frame means.

* * * * *